United States Patent [19]

Cheatham, Jr.

[11] Patent Number: 4,586,286
[45] Date of Patent: May 6, 1986

[54] OUTRIGGER LURE DEPTH CONTROL

[76] Inventor: James L. Cheatham, Jr., 1093 S. Hilton, Boise, Id. 83705

[21] Appl. No.: 787,666

[22] Filed: Oct. 15, 1985

[51] Int. Cl.$^4$ .............................................. A01K 97/00
[52] U.S. Cl. .......................................... 43/27.4; 43/4; 33/126.5
[58] Field of Search ................ 43/4, 25, 27.4; 33/126, 33/126.5

[56] References Cited

U.S. PATENT DOCUMENTS

| | | | |
|---|---|---|---|
| 2,669,785 | 2/1954 | Rydzewski | 33/126.5 |
| 3,149,419 | 4/1964 | Koznarski | 33/126 |
| 3,786,586 | 1/1974 | Swan | 43/4 |
| 3,874,108 | 4/1975 | Connor | 33/126 |
| 3,959,885 | 6/1976 | Edmiston | 43/25 |
| 4,167,829 | 4/1979 | Henze | 43/27.4 |

Primary Examiner—Nicholas P. Godici
Assistant Examiner—C. McKee
Attorney, Agent, or Firm—Paul F. Horton

[57] ABSTRACT

A lure depth control, used primarily for trolling, for an outrigger of the type having a base, a boom including a fixed member engaging the base and a rotatable member carrying a pulley, and a reel carrying a cable strung over the pulley. The lure depth control includes a vane-like first marker which is secured to the fixed member of the boom and a second marker, also vane-like, which is secured to the rotatable member of the boom. The first marker preferably carries a spirit level for leveling relative to earth and the second marker carries indicia, which may be in the form of straight lines sloped relative to one another about the longitudinal axis of the boom, indicating, relative to the fixed first marker, percentage increase in length of sloping cable needed to reach a known vertical depth.

11 Claims, 6 Drawing Figures

| VERTICAL ANGLE DEGREES & MINUTES | CABLE LENGTH FOR ANY VERTICAL ANGLE |
|---|---|
| 17°-45' | 1.05 D |
| 24°-37' | 1.10 D |
| 33°-33' | 1.20 D |
| 39°-44' | 1.30 D |
| 44°-25' | 1.40 D |
| 48°-11' | 1.50 D |
| 51°-19' | 1.60 D |
| 53°-58' | 1.70 D |
| 56°-15' | 1.80 D |
| 58°-15' | 1.90 D |
| 60°-00' | 2.00 D |

OUTRIGGER LURE DEPTH CONTROL

BACKGROUND OF THE INVENTION

1. Field of the Invention

This invention relates, in general, to depth determining and control devices, and in particular to devices for determining increase of cable length needed to reach a given vertical depth with a lure, because of cable slope due to water currents, boat speed, and other factors.

2. Description of the Prior Art

Electronic depth finders have long been used to determine vertical depth from the transducer of the depth finder, which is usually mounted in the bottom of a boat, to schools of fish; to river, lake, or ocean bottom; or to other objects located below water level. Because of water currents; the speed of the boat, as is the case in trolling; and the amount of line or cable drag, one does not know whether the lure is at proper depth determined by the depth finder because of the slope of the line or cable from vertical.

It is therefore highly desirable to be able to determine with accuracy the increase in cable length needed to accommodate for the cable slope for fishing at the desired depth.

Outriggers, and more particularly outriggers having a base; a two-section boom including a fixed section attached to the base and a rotatable section, rotatably mounted about the longitudinal axis of the boom; a reel; cable; and cable pulley are well known in the art. Also known in the art is the invention of E. J. Swan, U.S. Pat. No. 3,786,586, which includes a plate which is held in the horizontal position and which has a plurality of sloped lines which one compares with the slope of the cable while trolling to determine a first reference. One then checks a chart, displayed on the plate, to compare the first reference with the depth desired for determining length of line needed to reach a given vertical depth. The problem encountered with the Swan device is the gross inaccuracy due to several factors. First, the plate must be held in the horizontally level position, which is difficult because of a lack of a leveling device. Horizontal leveling must therefore be by sight which is particularly difficult while ocean fishing due to the pitch and roll of the boat and the presence of waves. Secondly, the plate must be held in a vertical position which is difficult for the same reasons. Thirdly, the slope of the cable must be compared to the lines on the plate by sighting through the plate. For accuracy, the sighting should be with the eye of the observer; the indicia line on the plate; and the liner cable for the outrigger all being on the same level—a virtual impossibility because the gunwale of the boat is most often too high relative to the cable to allow such sighting and the inconvenience of lowering the eye to the level of the cable is also obvious. Fourthly, the plate must be held in alignment with the boat for an accurate reading. This combination of factors, all of which must be performed simultaneously, renders the device of Swan impractical. A further disadvantage is the requirement of consulting a chart to determine further amount of line or cable to be payed out.

SUMMARY OF THE INVENTION

The present invention overcomes these problems of the prior art by providing a lure depth control having a first reference marker affixed to a fixed boom member and a second marker affixed to a rotatable boom member, the second marker having indicia thereon for precisely determining percentage length of cable which must be payed out from an outrigger to reach a desired vertical depth. A more precise description of the invention may be found in the appended claims.

It is therefore a primary object of the present invention to provide a lure depth control which is mounted on the boom of an outrigger and which automatically determines percentage increase in cable required to reach a desired vertical depth because of cable slope.

It is also an object of the present invention to provide a depth control which is mountable on the boom of an outrigger which frees the hands for other tasks and which does not require visual sighting of the cable to a reference to determine length of cable required to reach a given vertical depth.

Another object of the present invention is to provide a lure depth control which is readily adjusted to level, which is conveniently mounted on an existing outrigger, and which precisely determines cable length required to reach a given vertical depth.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
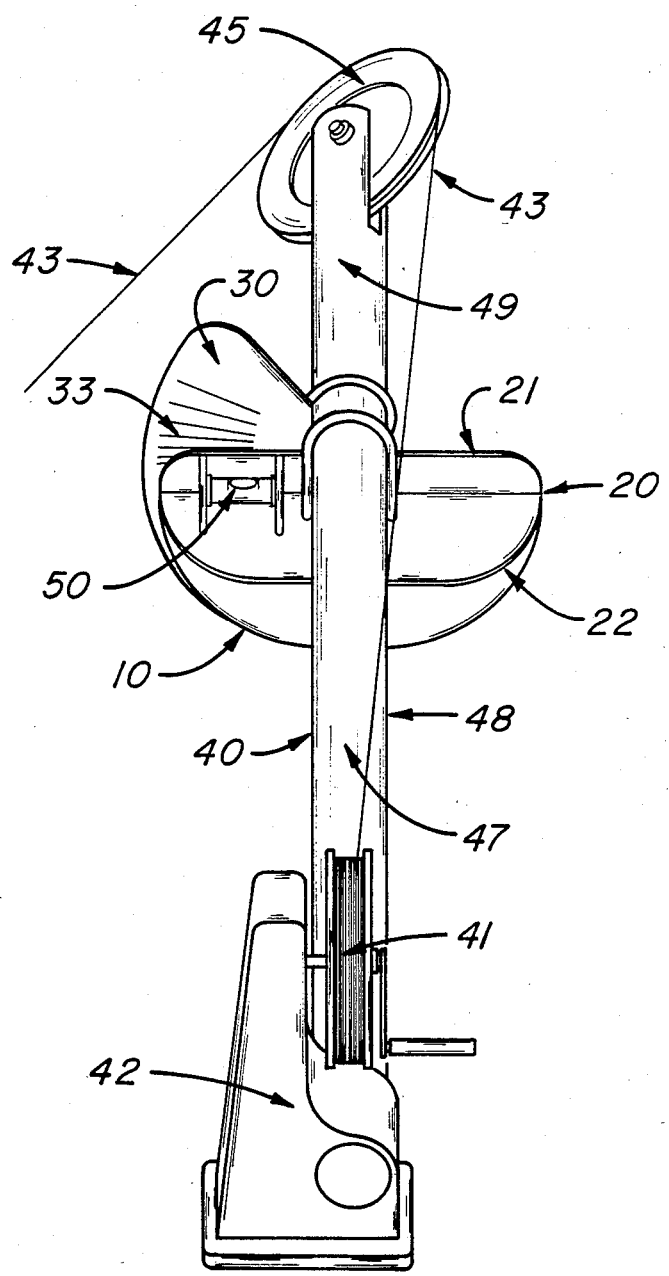
FIG. 1 is a perspective view of a preferred embodiment of the lure depth control of the present invention as mounted on an outrigger on the port side of the vessel.
Figure 2:
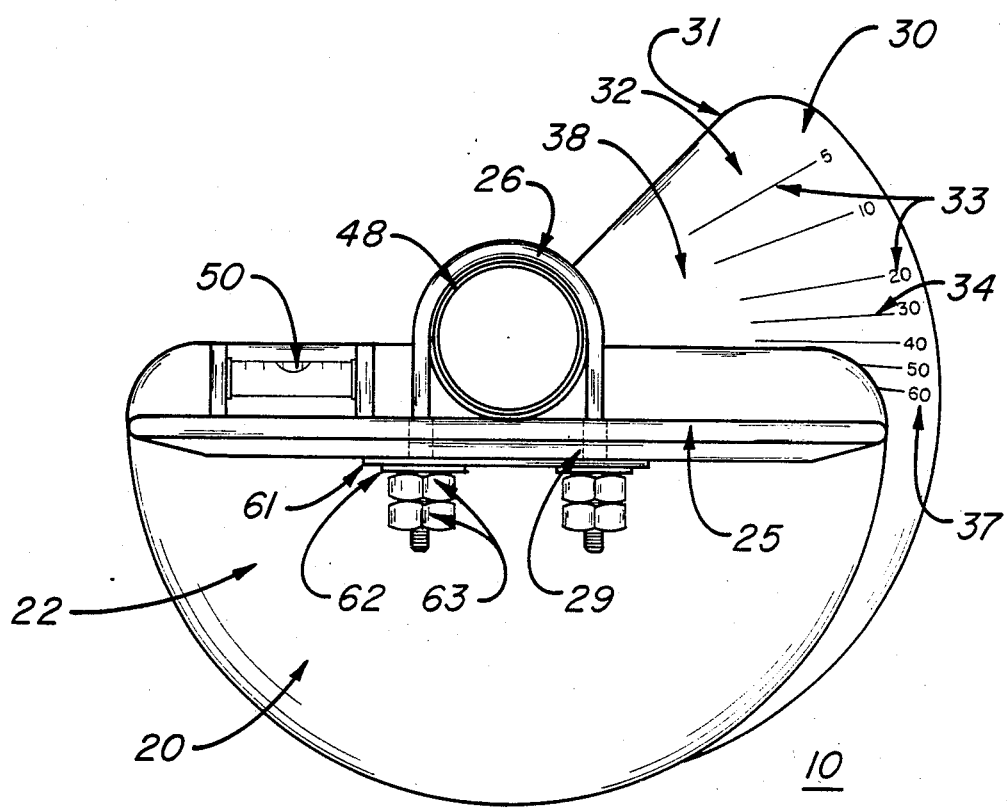
FIG. 2 is a front elevation of the depth control.

Referring now to the drawings, and, more particularly to FIGS. 1 and 2, an embodiment to be preferred of a lure depth control 10 made according to the present invention is disclosed. Depth control 10 is shown mounted to an outrigger, designated generally by the numeral 40. Depth control 10 includes first marker means 20 and second marker means 30.

Outrigger 40 is conventional in the art and is of the type having a base 42, which may be either stationary or swivel, a boom designated generally by the numeral 48, a reel 41 mounted on the base and carrying cable 43, and a pulley 45 over which the cable is strung. Boom 48 includes a fixed member 47 secured to base 42 and a coaxial rotatable member 49 which is rotatably mounted about the longitudinal axis of the boom to the fixed member 47.

Figures 4, 6:
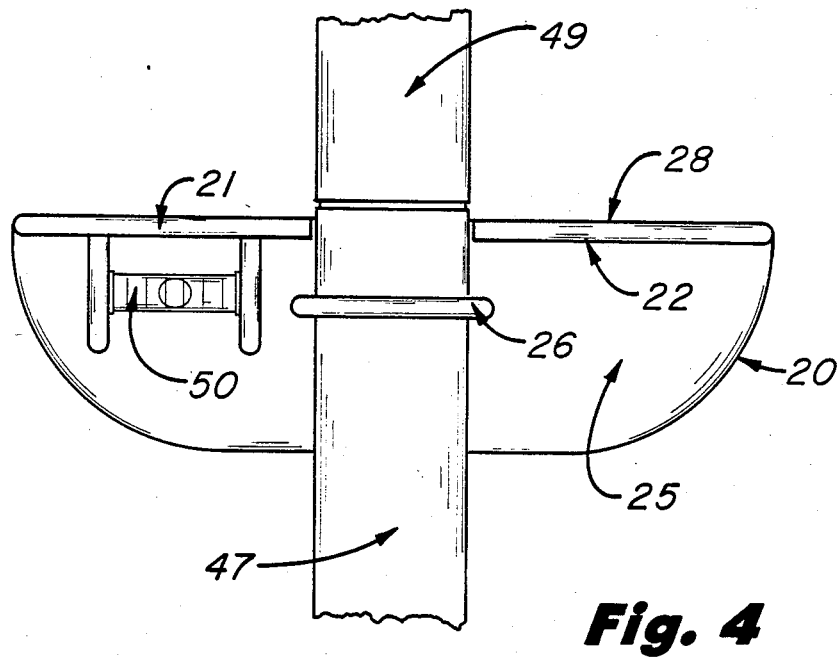
FIG. 4 is a plan view of the fixed marker.
FIG. 6 is a table showing the relationship between angle from vertical (line or cable slope) relative to percentage increase in cable length needed to reach a given depth.

Referring now to FIGS. 2 and 4, first marker means 20 may be seen to advantage. First marker means 20 is preferably in the shape of a vane 22, substantially semicircular in shape, having an upper surface 21 which is planar on opposing sides of fixed member 47 of boom 48, to which it is adjustably attached. Upper surface 21 is also preferably normal to the longitudinal axis of the boom for increased accuracy. The planar upper surface serves as a fixed reference to indicia, represented generally by the numeral 33, on second marker means 30. The upper surface 21 of the first marker must be low enough to allow clearance for cable 43 which is strung between the reel 41 and the pulley 45. It is obvious that the first marker could be constructed of clear plastic and could have a variety of reference marks for determining level. In the embodiment shown, first marker 20 includes a shelf 25 affixed to and extending rearwardly transverse of the vane 22. The shelf serves as a support structure for the mounting of a spirit level 50 and also functions to strengthen the vane. The first marker may be constructed of any suitable material, it being preferred that the complete marker be molded of plastic. The marker may be attached to fixed member 47 of boom 48 as by a U-bolt 26, the curved portion of which snugly engages boom member 47 and the legs of which extend through apertures 29 and shelf 25 to be held in place by a bed plate 61, washers 62, and nuts 63, as shown to advantage in FIG. 2.

Figure 3:
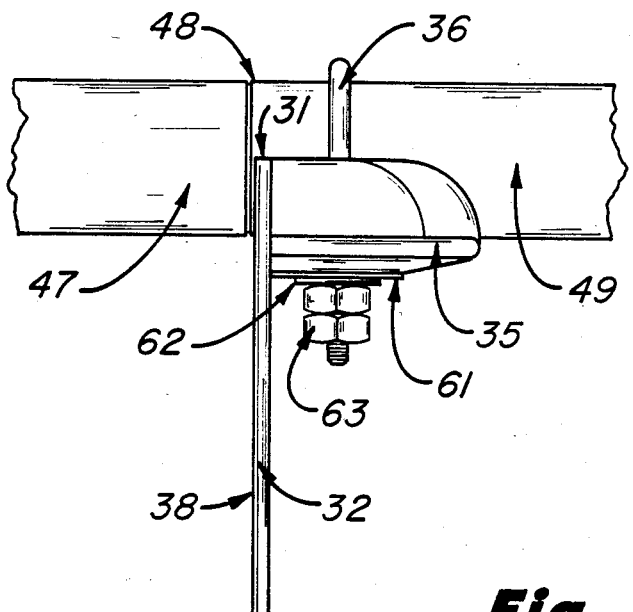
FIG. 3 is a side elevation, in partial section, showing attachment of the rotatable second marker to the rotatable member of the boom.

Second marker means 30, shown to advantage in FIG. 3, is preferably identical to first marker means 20 in material, shape, and construction, so as to be interchangeable therewith. Second marker means includes a vane 32 having an upper surface 31 and a shelf 35. Likewise, marker means 30 is attachable to rotatable member 49 of boom 48 in the same manner as first marker 20 is to fixed member 47 of the boom, as by U-bolt 36, bed plate 61, washers 62, and nuts 63. Second marker 30 is mounted on rotatable member 49 of boom 48 in close juxtaposition to first marker 20 with the flat surface 38 of vane 32 facing the flat surface 28 of vane 22. Carried on the flat surface 38 of vane 32 is marking indicia, designated generally by the numeral 33. Indicia 33 includes two sets of markings, oppositely disposed from one another on opposing sides of boom 48 as may be seen in FIGS. 1 and 2. One set of markings, as in FIG. 1, is used for port side mounting and the other set, FIG. 2, is used for starboard side mounting. Each set includes marks set at a preselected angle to one another about a common axis. The marks are preferably in the form of straight lines 34, each being substantially normal to the longitudinal axis of boom 48. Each mark represents percentage increase of cable required to reach a known vertical depth from pulley 45. Lines 34 may be accompanied by numerals 37 showing the numerical value of the percentage increase required. First marker 20 may also include the same indicia, but only for purposes of being interchangeable with the second marker 30.

Figure 5:
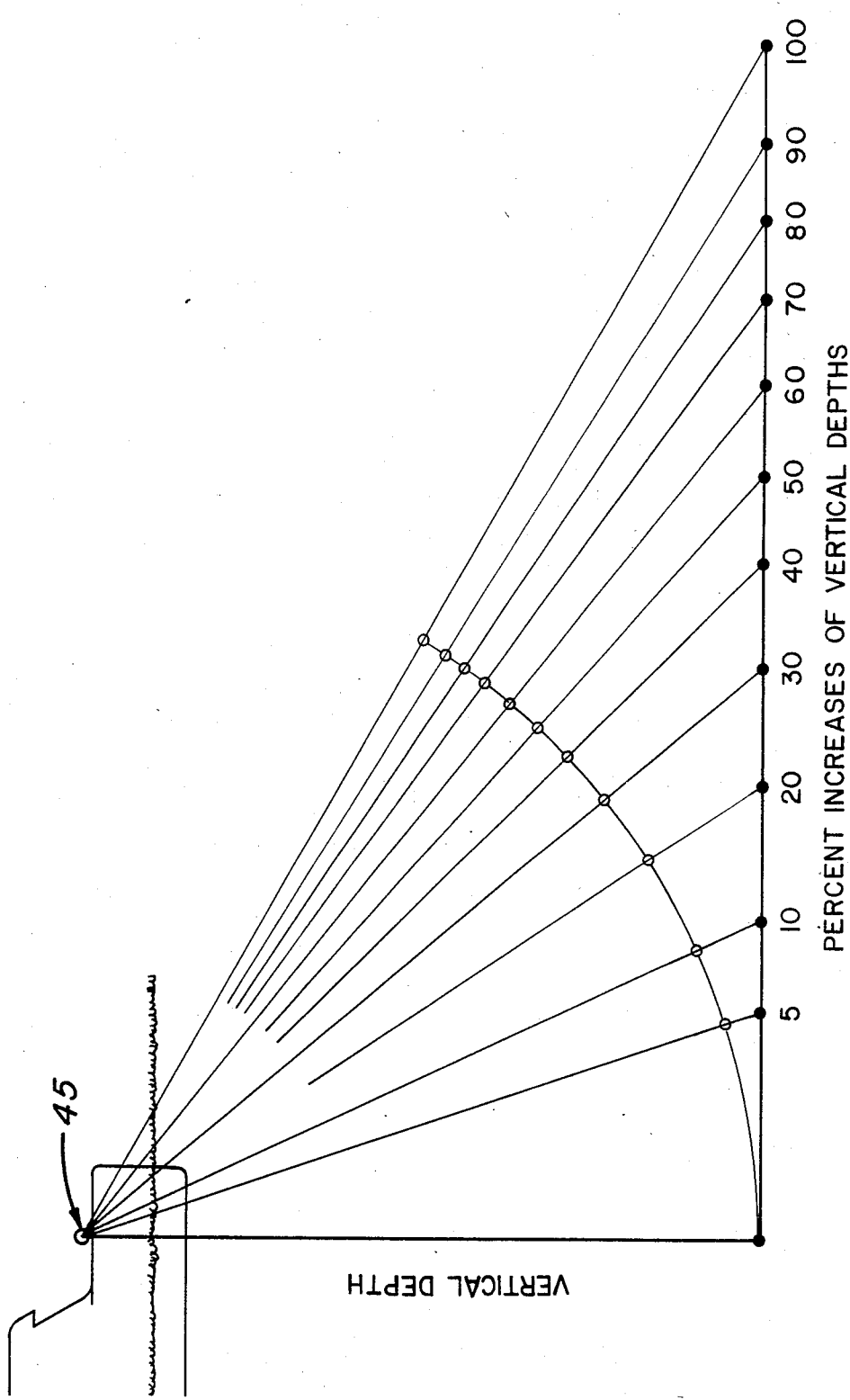
FIG. 5 is a graph showing means for determining proper angle and placement of marking indicia.

Referring now to FIGS. 5 and 6, a graph and table, respectively, are shown. The graph in FIG. 5 shows vertical depth from the pulley of the outrigger as plotted against the percentage increase in cable length required to obtain any given vertical depth. Each line between the outrigger and given vertical depth representing the length of cable required at a given slope. The table in FIG. 6 shows cable length required to reach a given vertical depth, D, when the cable is sloped from vertical at given degrees and minutes. The same angles as shown on the graph and in the table are inscribed or placed on the front surface of the second marker for ascertaining percentage increase in cable required, using the planar upper surface of the first marker as a reference point.

For operation, the first marker is mounted, as before described, onto fixed member 47 of boom 48 with the front surface facing outwardly toward pulley 45. The first marker is leveled at trolling speed with reference to earth by spirit level 50 before securing, and then re-leveled as needed. Second member 30 is mounted securely on rotatable member 49 of the boom with its flat surface 38 facing surface 28 of first marker 20 and with its planar upper surface 31 parallel with the horizontal axis of pulley 45. Once a desired vertical depth is determined, as by sonar, cable 43 may be payed out from reel 41. If, for example, the sonar detects fish at a 50 foot depth from the the detector transducer, cable 43 is payed out a distance of 50 feet, plus the vertical distance between the transducer and pulley 45 of outrigger 40. Assuming such distance is 10 feet, the cable must be payed a distance of 60 feet, assuming there is no slope to the cable. Should the cable be sloped, under drag of the lure by forward movement of the boat, water currents, or a combination of factors, the drag causes pulley 45 and rotatable member 49 of boom 48 to rotate about the longitudinal axis of the boom. Second marker 30, securely affixed to member 49, also rotates relative to the fixed first marker 20. Assuming the second marker rotates to a position, as shown in FIG. 2, it then becomes immediately evident, in that the straight line 34 indicates a 40% increase required, that an additional 24 feet—a total of 84 feet—of cable is to be payed out to reach a vertical depth of 60 feet from pulley 45 to the depth of the fish. Calculations are easily determined by adding to the known vertical depth, the percentage increase required, as shown by the marking indicia. For convenience, marker lines 34 are inscribed or otherwise placed on the flat surface 38 of vane 32 in percentage increments of 5 or 10%.

Besides being used for controlling depth of a fishing lure, it is obvious that the apparatus is usable for many other purposes and may be used equally well on any cable having "lure" drag by wind, water, or other fluids, and therefore the term "lure" as used herein and in the appended claims is to be given its broadest definition as is the term "outrigger".

Having thus described in detail a preferred embodiment of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A lure depth control for an outrigger of the type having a base, a boom including a fixed member attached to said base and a rotatable member rotatingly engaging said fixed member, a pulley attached to said rotatable member of said boom, a reel attached to said base, and a cable carried by said reel and engaging said pulley, wherein the lure depth control comprises:

first marker means attached to said fixed member of said boom, said first marker means including an upper surface, at least a portion of which is substantially planar and normal to the longitudinal axis of said boom; and second marker means affixed to said rotatable member of said boom so as to be rotatable therewith, said second marker means including at least one set of marking indicia including a plurality of straight lines, each of said lines being substantially normal to the longitudinal axis of said boom for determining percentage increase of cable required to reach a known vertical depth from said pulley when said rotatable member of said boom and thus said second marker means is rotated relative to said first marker means by drag upon said cable.

2. The apparatus as described in claim 1 wherein said first marker means include leveling means.

3. The apparatus as described in claim 2 wherein said leveling means comprises a spirit level.

4. The apparatus as described in claim 1 wherein said indicia includes a plurality of marks, each mark representing a predetermined angle relative to vertical.

5. The apparatus as described in claim 4 wherein said indicia further comprises a plurality of numbers, each number representing a percentage increase in cable length required to reach a known vertical depth.

6. The apparatus as described in claim 1 wherein said first marker means includes an upper surface, opposing sides of which are substantially normal to the longitudinal axis of said boom and wherein said second marker means includes two sets of marking indicia, oppositely disposed from one another, on opposing sides of said boom, each set of marking indicia including a plurality of straight lines, each of said lines being substantially planar with the longitudinal axis of said boom.

7. A lure depth control for an outrigger of the type having a base, a boom including a fixed member attached to said base and a rotatable member rotatingly engaging said fixed member, a pulley attached to said rotatable member of said boom, a reel attached to said base, and a cable carried by said reel and engaging said pulley, wherein the lure depth control comprises:

first marker means attached to said fixed member of said boom, said first marker means having a planar upper surface separated by said boom, said planar upper surface being substantially normal to the longitudinal axis of said boom; and second marker means affixed to said rotatable member of said boom so as to be rotatable therewith, said second marker means in close juxtaposition with said first marker means, and said second marker means including two sets of marking indicia, each set oppositely disposed from the other on opposing sides of said boom, and each set of marking indicia including a plurality of marks, each mark representing the percentage increase of cable required to reach a known vertical depth from said pulley when said rotatable member of said boom and thus said second marker means is rotated relative to said first marker means by drag upon said cable.

8. The apparatus as described in claim 7 wherein said second marker means has a planar upper surface separated by said boom, said planar upper surface being substantially normal to the longitudinal axis of said boom and parallel to the axis of said pulley.

9. The apparatus as described in claim 7 wherein each of said marks of said marking indicia is a straight line, set at a preselected angle relative to one another, each line being substantially normal to the longitudinal axis of said boom.

10. The apparatus as described in claim 7 further comprising a spirit level mounted on said first marker means for leveling the marker relative to earth.

11. The apparatus as described in claim 7 wherein each of said first and second marker means includes a vane-like body portion and a shelf transversely extending from said body portion.

* * * * *